(12) United States Patent
Borton (10) Patent No.: US 11,655,137 B2
(45) Date of Patent: May 23, 2023

(54) SERVICE CART WITH CONFIGURABLE DISPLAY PANEL

(71) Applicant: Robert Bosch GmbH, Stuttgart (DE)

(72) Inventor: Benjamin Borton, Richfield, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 99 days.

(21) Appl. No.: 17/406,477

(22) Filed: Aug. 19, 2021

(65) Prior Publication Data

US 2023/0055217 A1 Feb. 23, 2023

(51) Int. Cl.
*B67D 7/84* (2010.01)
*B60S 5/00* (2006.01)
*B67D 7/56* (2010.01)
*B67D 7/02* (2010.01)

(52) U.S. Cl.
CPC ............... *B67D 7/845* (2013.01); *B60S 5/00* (2013.01); *B67D 7/02* (2013.01); *B67D 7/56* (2013.01)

(58) Field of Classification Search
CPC ............. B67D 7/845; B67D 7/02; B67D 7/56
USPC ........................................................ 141/231
See application file for complete search history.

(56) References Cited

U.S. PATENT DOCUMENTS

| 8,671,996 B2* | 3/2014 | Weilhoefer | A61M 1/1668 |
| | | | 141/82 |
| 2008/0135128 A1* | 6/2008 | Flournoy | B60T 17/222 |
| | | | 141/98 |
| 2016/0023640 A1* | 1/2016 | Casale | B67D 7/02 |
| | | | 141/94 |

* cited by examiner

*Primary Examiner* — Jason K Niesz
(74) *Attorney, Agent, or Firm* — David Kovacek; Maginot, Moore & Beck LLP (57) ABSTRACT

A fluid exchange service cart for performing fluid exchange service operations on a vehicle. The fluid exchange service cart additionally comprises an instrument panel and a number of panel loci to which the instrument panel may be detachably appended in different operating configurations.

18 Claims, 6 Drawing Sheets

SERVICE CART WITH CONFIGURABLE DISPLAY PANEL

TECHNICAL FIELD

This disclosure relates to fluid exchange service carts for use in automotive repair and maintenance.

BACKGROUND

Fluid exchange service carts are utilized in automotive repair and maintenance to perform tasks related to fluid-based systems of automobiles. Carts can be used to charge fluid into an empty system, calibrate fluid volume or fluid pressure within the system, create vacuum during maintenance or other service, or diagnose operational issues within the system. Service carts may be optimized to work with different systems of the automobile, such as being configured to optimally interact with particular fluids, such as refrigerants, hydraulic fluid, transmission fluid, brake fluid, or any other fluid known to one ordinary skill in the art.

Conventional fluid exchange service carts are generally designed for use by a technician within a somewhat controlled shop environment. However, there is increasing desire to operate such service carts in other environments, including for "in the field" operations outside of a shop. Accordingly, it would be advantageous to have adaptable features of a service cart that can be optimized for different operational environments.

SUMMARY

One aspect of this disclosure is directed to a fluid exchange service cart having a chassis, a reservoir, a fluid channel, a processor, and an instrument panel. The chassis further comprises a number of panel loci. The instrument panel is configured to be detachably appended to each of the panel loci. The fluid exchange service cart may be configured such that the panel instrument is appended to a particular panel locus of the panel loci. The processor is further operable to selectively control fluid communication between the reservoir and the fluid channel. Each of the panel loci may be associated with different portions of the chassis. The chassis may comprise an upward-facing portion and a forward-facing portion thereof, each of the portions comprising a panel locus. The instrument panel may be in data communication with the processor, and the processor may be configured to control the operations of fluid exchange service cart. A user may utilize the instrument panel to interact with the fluid exchange service cart, including during service operation.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
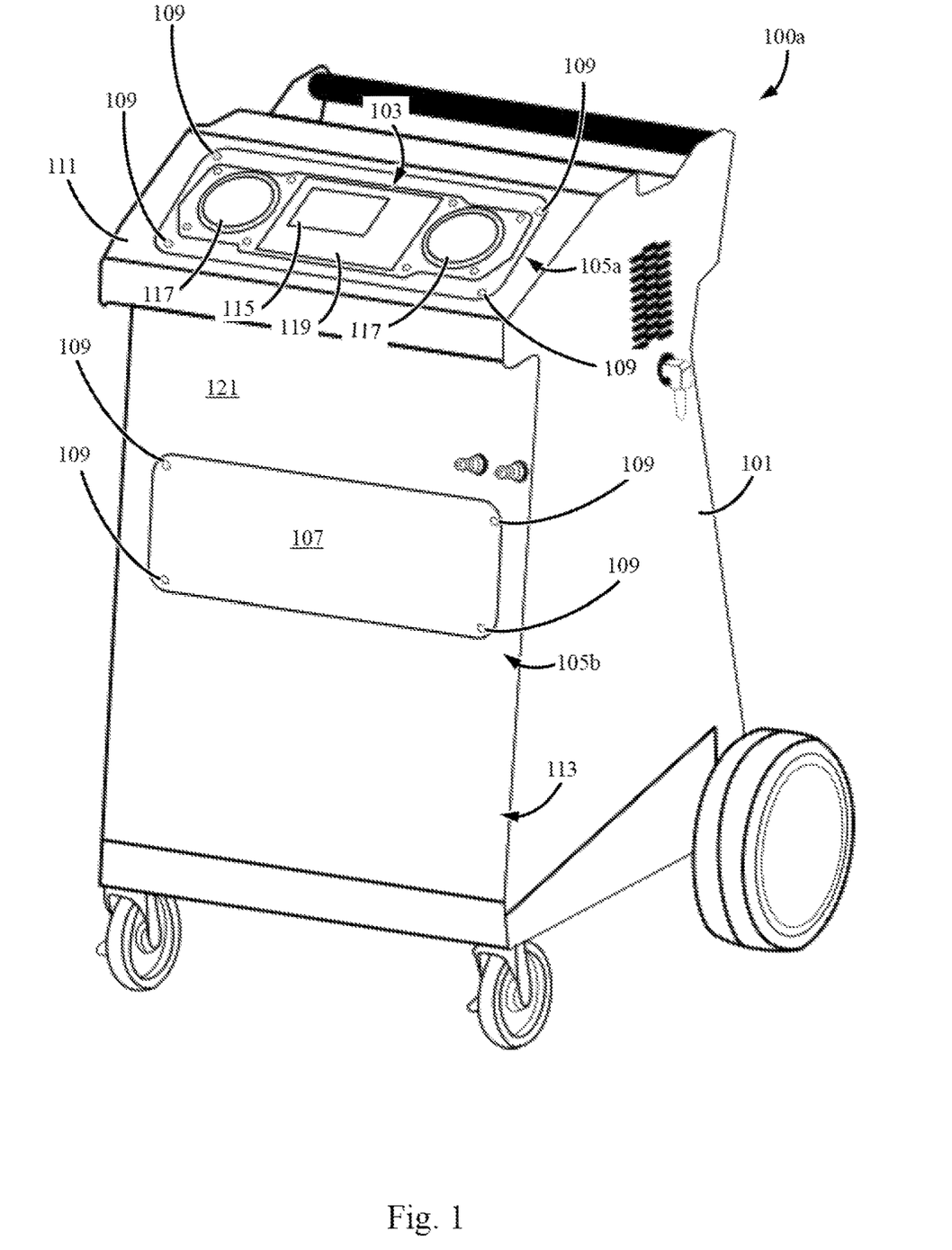
FIG. 1 depicts a fluid exchange service cart having an instrument panel in a first position.

FIG. 1 shows an exterior view of a fluid exchange service cart 100 having a chassis 101 and an instrument panel 103. Instrument panel 103 may advantageously be appended to multiple panel loci 105 of service cart 100. In FIG. 1, service cart 100 is denoted as service cart 100a because it is depicted in a configuration wherein instrument panel 103 is appended to panel locus 105a. Other configurations of the same embodiment may comprise a different appended location of instrument panel 103 without deviating from the teachings herein. In the depicted embodiment, chassis 101 is fitted with a blank panel 107 such that chassis 101 does not have a gap the unused panel locus 105b. Both instrument panel 103 and blank panel 107 are detachably appended to their respective panel locus 105 using fasteners 109. In embodiments having more than two panel loci 105, an equivalent number of blank panels 107 may utilized. In the depicted embodiment, fasteners 109 may comprise a screw, but other embodiments may comprise other configurations without deviating from the teachings disclosed herein. In the depicted embodiment, each panel locus 105 comprises four receivers for a fastener 109 to append a panel, but other embodiments may comprise a different number of fasteners 109 without deviating from the teachings disclosed herein.

Chassis 101 may have an exterior surface and an interior surface. In the depicted embodiment, chassis 101 comprises an exterior surface 110 having an upward-facing surface 111 and a forward-facing surface 113. Upward-facing surface 111 is the supporting surface for panel locus 105a. Forward-facing surface 113 is the supporting surface for panel locus 105b. Though panel loci 105a and 105b are the only panel loci in the depicted embodiment, other embodiments may comprise additional or different panel loci 105 supported by other surfaces of chassis 101 without deviating from the teachings disclosed herein. In the depicted embodiment, the upward-facing surface 111 and forward-facing surface 113 are called out explicitly, but other surfaces of chassis 101 may be considered for supporting other or additional panel loci 105 without deviating from the teachings disclosed herein. In particular, chassis 101 may comprise panel loci 105 on rearward-facing surfaces, or sideways-facing surfaces (not shown) without deviating from the teachings disclosed herein.

In the depicted embodiment, instrument panel 103 is comprised of individual elements that relay information about a service operation to a user of service cart 100. In the depicted embodiment, instrument panel 103 comprises an electronic display 115, a plurality, of gauges 117, and a human-user interface (HMI) 119. In the depicted embodiment, each of these components may be in communication with other elements of service cart 100. By way of example, and not limitation, electronic display 115 and HMI 119 may be in data communication with a processor (not shown, see FIG. 3). In the depicted embodiment, one or more of gauges 117 may be in fluid communication with a reservoir of service cart 100 (not shown, see FIG. 3). In some embodiments, one or more of gauges 117 may be in data communication with the processor. In the depicted embodiment, HMI 119 may comprise a number of hardware buttons, but other embodiments may comprise other or additional interface elements such as a touchscreen, knobs, dials, switches, rotary encoders, button encoders, or any other interface element recognized by one of ordinary skill in the art without deviating from the teachings disclosed herein. In the depicted embodiment, each of the elements of instrument panel 103 may be in a wired data communication with the processor, but other embodiments may comprise other configurations having one or more wireless communication elements without deviating from the teachings disclosed herein.

The upward-facing surface 111 and forward-facing surface 113 of chassis 101 are elements of an exterior surface of chassis 101. Chassis 101 further comprises an interior surface (not shown, see FIG. 3) that defines an interior cavity which houses additional elements of service cart 100. These additional elements are addressed in further detail with respect to the description of FIG. 3.

Figure 2:
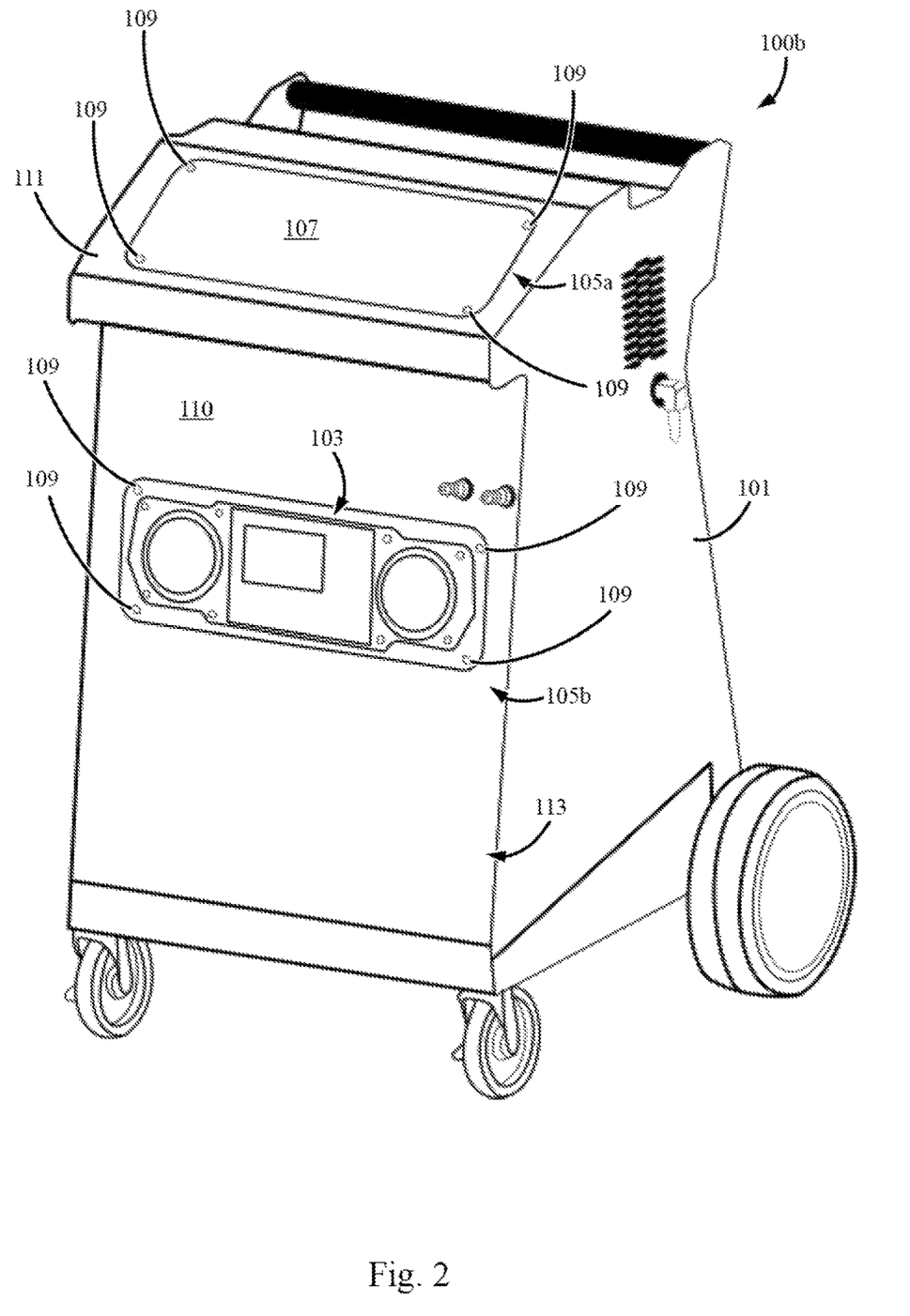
FIG. 2 depicts a fluid exchange service cart having an instrument panel in a second position.

FIG. 2 depicts a second configuration of service cart 100, herein labeled as service cart 100b. In the configuration of service cart 100b, instrument panel 103 is appended to forward-facing surface 113 via panel locus 105b. In the depicted embodiment, blank panel 107 has been moved to panel locus 105a accordingly, but other embodiments may not utilize blank panel 107 without deviating from the teachings disclosed herein.

In the alternative configuration for service cart 100b, all of the elements of instrument panel 103 remain in their respective communications with other elements (i.e., a processor, reservoir, etc.), and operate normally. This advantageously permits a user of service cart 100 to position instrument panel 103 in a particular panel locus 105 that optimizes the accessibility of the instrument panel.

Figure 3:
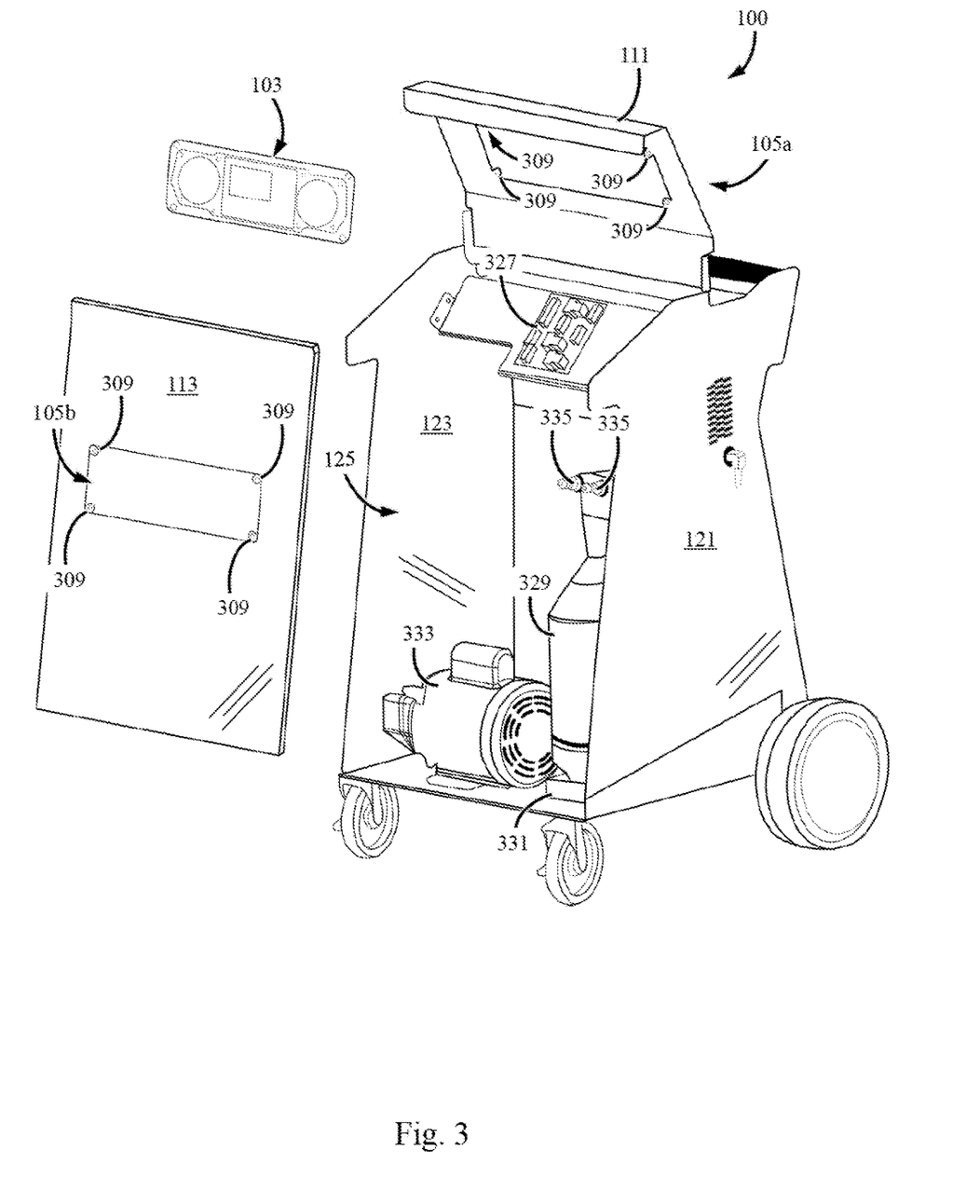
FIG. 3 depicts a partially disassembled view of a fluid exchange service cart during a relocation of an instrument panel.

In the depicted embodiment, changing the configuration of service cart 100 is best accomplished via a partial disassembly of chassis 101. FIG. 3 is a depiction of service cart 100 in a partially-disassembled state. In the partially-disassembled state, an interior surface 123 of chassis 101 can be observed. The interior surface 123 defines the boundaries of an interior cavity 125 that houses a number of other functional elements of service cart 100.

In the depicted embodiment, forward-facing surface 113 has been removed from the front of service cart 100, and upward-facing surface 111 has been tilted up away from the rest of chassis 101. In the depicted embodiment, forward-facing surface 113 may form a portion of chassis 101 when appended thereto, and may be appended detachably using a number of fasteners (not shown). In the depicted embodiment, the fasteners utilized to detachably append forward-facing surface 113 to the rest of chassis 101 may comprise screws, but other fasteners may be utilized without deviating from the teachings disclosed herein. In some embodiments, forward-facing surface 113 may be appended to the rest of chassis 101 utilizing other hardware elements, such as a hinge, latch, slot interface, bolt, lock, or any other appending hardware known to one of ordinary skill in the art without deviating from the teachings disclosed herein.

In the depicted embodiment, upward-facing surface 111 is tilt-able with respect to the rest of chassis 101 because it is appended thereto using a hinge, but any other connective hardware component may be utilized to detachably append the upward-facing surface 111 to the rest of chassis 101 without deviating from the teachings disclosed herein.

In the depicted embodiment, each of the upward-facing surface 111 and the forward-facing surface 113 may be advantageously detachably appended to chassis 101 for the purpose of giving a user access to their respective portions of interior surface 123. In the depicted embodiments, a number of receiving nuts 309 configured to receive each of fasteners 109 are mounted on the interior surface 123, but other embodiments may comprise other configurations without deviating from the teachings disclosed herein. Advantageously, when the receiving nuts 309 are mounted to the interior surface 123, the instrument panel 103 is coupled to chassis 101 in a manner that is detachable, but still secure from outside the chassis 101. This secure coupling advantageously protects instrument panel 103 from outside tampering. The secure coupling also advantageously prevents tampering with any of the internal components of service cart 100. The secure coupling also advantageously prevents tampering with connections between instrument panel 103 and any of the internal components. Preventing such tampering additionally limits the possibility of improper handling causing a failure of one or more functions of service cart 100. Additionally, requiring a partial disassembly of chassis 101 in order to reconfigure the placement of instrument panel 103 necessarily requires that service cart 100 be disconnected from any vehicle and from external power sources, advantageously improving the safety to both the user performing the reconfiguration, and the components of service cart 100.

FIG. 3 additionally depicts a number of functional elements of service cart 100. Within the interior cavity 125, service cart 100 comprises a processor 327, reservoir 329, scale 331, and compressor 333. Each of these elements is utilized by service cart 100 during service operations, such as transferring fluid, charging fluid, measuring fluid, or the like. Fluid may be stored in reservoir 329, and pass between service cart 100 and a vehicle via a number of fluid channels 335 in fluid communication with the reservoir 329. Scale 331 is utilized to generate weight data indicating the weight of reservoir 329, which may be utilized to determine how much fluid is stored within the reservoir. Compressor 333 is operable to generate pressure within a fluid circuit such that fluid may be exchanged between a vehicle and service cart 100. In the depicted embodiment, service 100 comprises compressor 333, but other embodiments may utilize a pump, or equivalent component without deviating from the teachings herein. Processor 327 is configured to control compressor 333 and each of the fluid channels 335 during service operations. In particular, processor 327 is operable to engage of disengage compressor 333, and selectively control the fluid communication between the reservoir and each fluid channel. The selectively control of the fluid communication is accomplished via the processor being operable to selectively open or close each of fluid channels 335. In the depicted. embodiment, processor 327 is operable to selectively open or close each of fluid channels 335 independently, but other embodiments may comprise other configurations without deviating from the teachings disclosed herein. Processor 327 may be in electric control of each of compressor 333 and fluid channels 335. Processor 327 may additionally be in data communication with scale 331 to receive the weight data when generated. Processor 327 may additionally be in data communication with the elements of instrument panel 103, such as the electronic display 115, one or more of gauges 117, and the HMI 119 (see FIG. 1). In some embodiments, a pressure measurement of the internal pressure of the reservoir may be acquired by a pressure sensor (not shown) in fluid communication with reservoir 329 operable to generate pressure data. The pressure data may be delivered to processor 327 or may be displayed directly on one of gauges 117 (see FIG. 1) as a pressure gradient without deviating from the teachings disclosed herein. The pressure data may be delivered as an electrical signal, or as a pressure gradient using a pneumatic or hydraulic exchange without deviating from the teachings disclosed herein.

FIG. 3 depicts service cart 100 in a state suitable for configurable arrangement of instrument panel 103. The connectivity of the elements of service cart 100 may be achieved using a number of connectors (not shown). By way of example, and not limitation, each of the elements of service cart 100 may be disconnected during partial-disassembly for configurable arrangement of instrument panel 103. Once instrument panel 103 has been detachably appended to one of panel loci 105, the connectors may be re-inserted to establish the proper connections of the elements of service cart 100. After all the connection have been established, upward-facing surface 111 may be titled into its resting position, and forward-facing surface 113 may be re-coupled to the rest of chassis 101. In the depicted embodiment, a blank panel 107 (not shown; see FIG. 1) may be detachably appended to the unused panel locus 105, but other embodiments may omit this step without deviating from the teachings disclosed herein.

Figure 4:
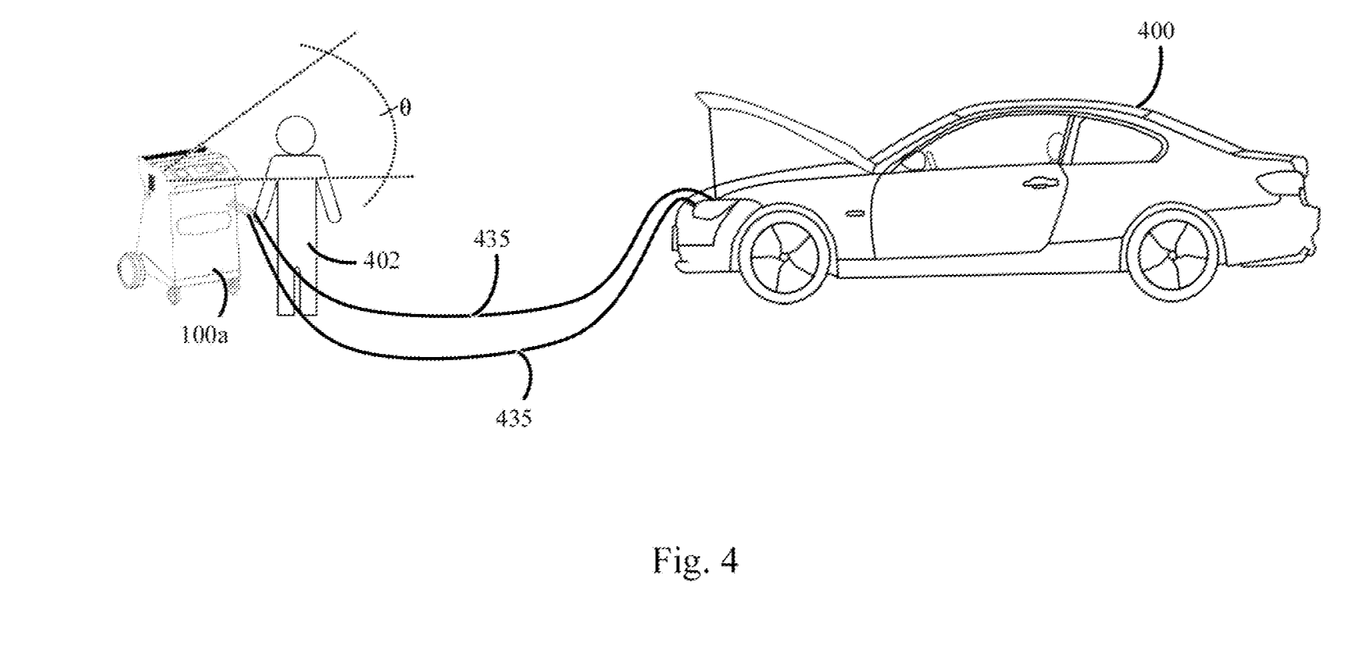
FIG. 4 depicts a fluid exchange service operation using a fluid exchange service cart in a first condition.

The configurability of the arrangement of instrument panel 103 may be utilized to optimize the ergonomics of the service cart 100 during use. FIG. 4 depicts a first environment in which the service cart 100 may be optimized for use. In the depicted scenario, service cart 100 is utilized to perform fluid service operations for a vehicle 400 by a user 402. Additionally depicted are a number of hoses 435 in fluid communication with fluid channels 335 (see FIG. 3), creating a fluid circuit between service cart 100 and the corresponding system of vehicle 400. In this scenario, service cart 100 is positioned on a ground level with vehicle 400. In this scenario, service cart 100 is configured as service cart 100a such that the instrument panel 103 is appended to the upward-facing surface 111 (see FIG. 1). In this configuration, a viewing angle θ is established. User 402 is comfortably able to observe and interact with instrument panel 103 whenever their eyes are within the viewing angle θ. Thus, in the presented scenario, service cart 100 is optimally arranged into the 100a configuration, because the user's eyes are within viewing angle θ when standing during the service operation.

Figure 5:
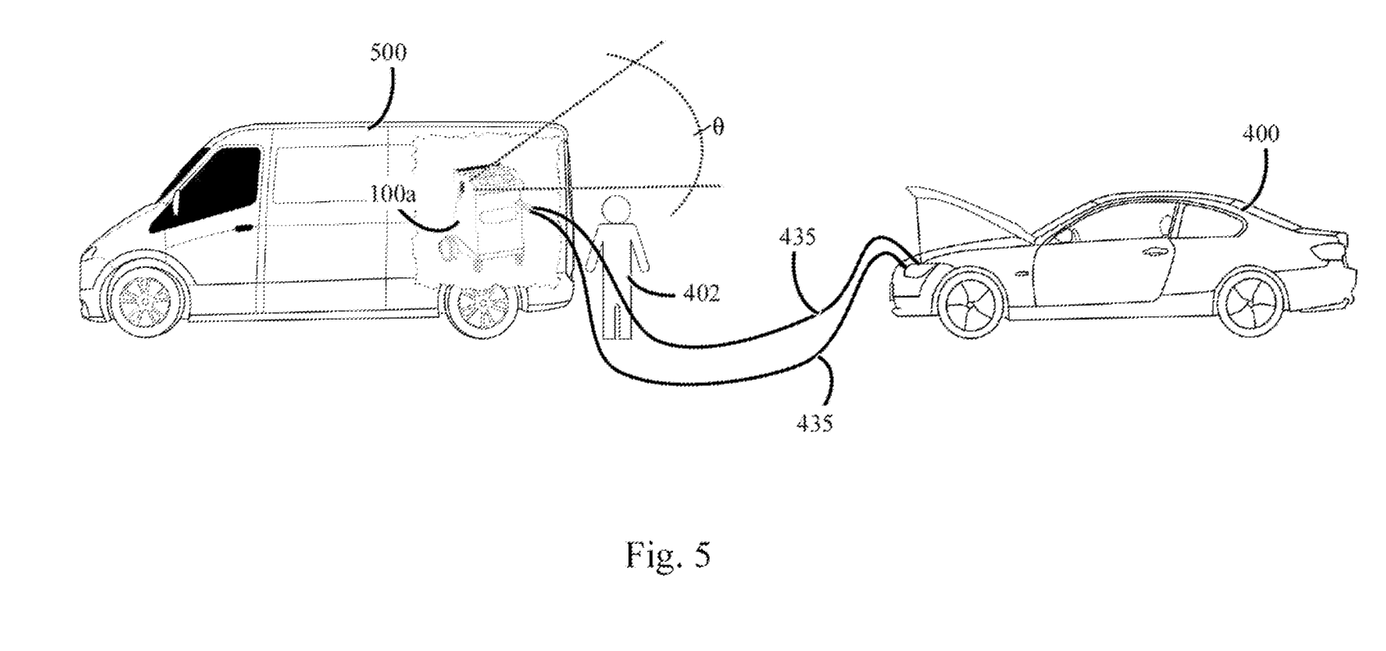
FIG. 5 depicts a fluid exchange service operation using a fluid exchange service cart in a second condition.

FIG. 5 depicts a different scenario in which service cart 100 remains in the 100a arrangement (see FIG. 1), but is instead operated from inside a service vehicle 500. In this scenario, service cart 100 remains in fluid communication with vehicle 400 via hoses 435 as previously described. However, with instrument panel 103 appended to upward-facing surface 111, the viewing angle θ is unsatisfactory for the user 402 working from the ground level outside of service vehicle 500. In this arrangement, user 402 is not able to see instrument panel 103 from outside the service vehicle 500, and has difficulty interacting with the instrument panel 103, such as utilizing HMI 119 (see FIG. 1). In this scenario, it is non-ideal for instrument panel 103 to be appended to panel locus 105a (see FIG. 1).

Figure 6:
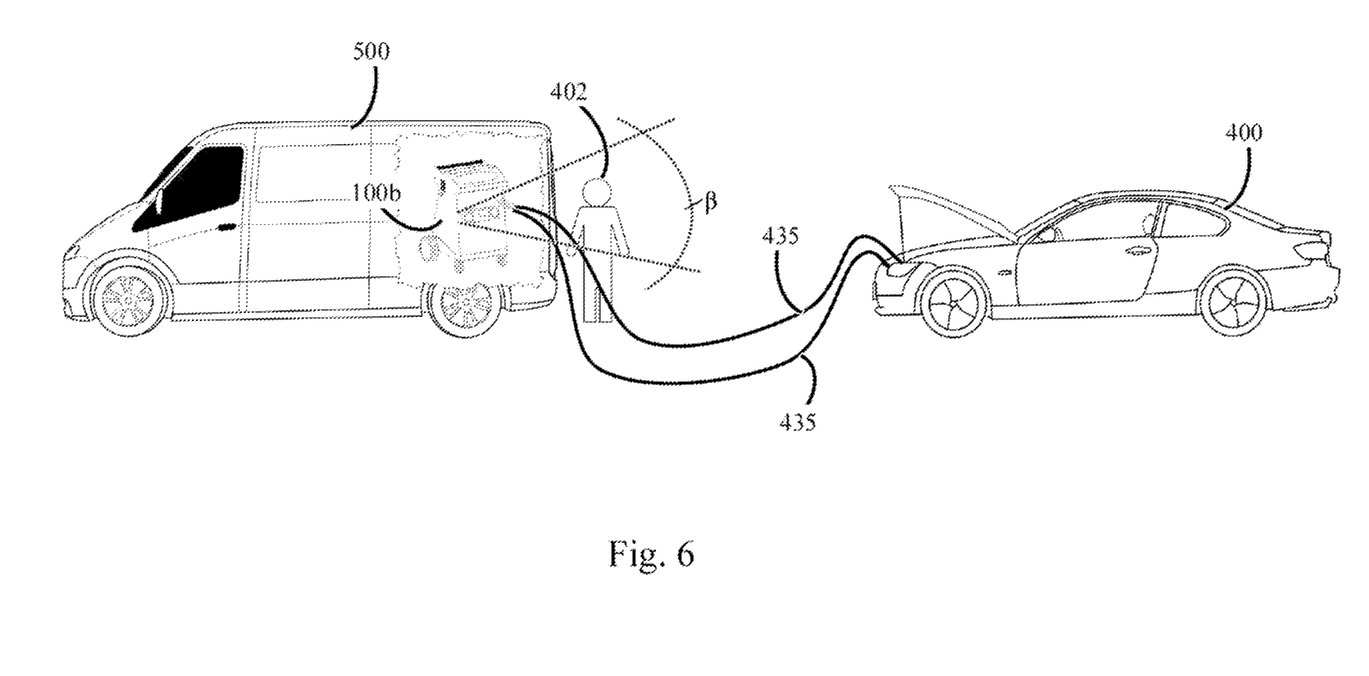
FIG. 6 depicts a fluid exchange service operation using a fluid exchange service cart in a third condition.

FIG. 6 depicts a similar scenario to FIG. 5, except service cart 100 has been configured into the 100b arrangement, with instrument panel 103 appended to panel locus 105b (see FIG. 2). In this arrangement, everything about the operation of service cart 100 remains the same, and the service operation is unchanged, but a second viewing angle β is instead created, which is optimized for the user 402 from outside of the service vehicle 500. In this arrangement, the user 402 is able to see and interact with instrument panel 103 from outside the service vehicle 500 easily and efficiently, thus optimizing the service operation ergonomics. Thus, the configurability of service cart 100 advantageously permits a user (such as user 400) to optimize the arrangement of instrument panel 103 (see FIG. 1, FIG. 2) to their personal preferences, or based upon the conditions in which they plan to use service cart 100. Other embodiments may comprise additional or different arrangements, such as providing additional panel loci 105 (see FIG. 1, FIG. 2) without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A fluid exchange service cart comprising:
   a chassis having an exterior surface and an interior surface, the interior surface defining an interior cavity;
   a reservoir disposed at least partially within the interior cavity;
   a fluid channel in selectable fluid communication with the reservoir;
   a processor operable to selectively control the fluid communication between the reservoir and the fluid channel; and
   an instrument panel in data communication with the processor,
   wherein the chassis further comprises a plurality of panel loci, each panel locus configured to detachably append the instrument panel to the chassis.

2. The fluid exchange service cart of claim 1, wherein the chassis further comprises a forward-facing portion and one of the plurality of panel loci is situated such that it detachably appends the instrument panel to the forward-facing portion.

3. The fluid exchange service cart of claim 1, wherein at least one of the panel loci is configured to detachably append the instrument panel to the interior surface.

4. The fluid exchange service cart of claim 1, further comprising a number of blank panels configured to detachably append to each of the panel loci, the number of blank panels being one fewer than the plurality of panel loci.

5. The fluid exchange service cart of claim 1, wherein the instrument panel comprises a pressure gauge indicating a pressure measurement within the reservoir.

6. The fluid exchange service cart of claim 1, wherein the reservoir is configured to contain refrigerant.

7. The fluid exchange service cart of claim 1, wherein the reservoir is configured to contain hydraulic fluid.

8. The fluid exchange service cart of claim 1, wherein the instrument panel is configured to append to each of the plurality of panel loci using a screw.

9. The fluid exchange service cart of claim 1, wherein the fluid channel is a first fluid channel, and further comprising a second fluid channel in selectable fluid communication with the reservoir, wherein the processor is further operable to selectively control the fluid communication between the reservoir and the second fluid channel.

10. The fluid exchange service cart of claim 1, wherein the chassis further comprises an upward-facing portion and a first panel locus is situated such that it detachably appends the instrument panel to the upward-facing portion.

11. The fluid exchange service cart of claim 10, wherein the chassis further comprises a forward-facing portion and a second panel locus is situated such that it detachably appends the instrument panel to the forward-facing portion.

12. The fluid exchange service cart of claim 1, wherein the instrument panel is in wired data communication with the processor.

13. The fluid exchange service cart of claim 12, wherein the chassis is configured to be partially disassembled when moving the instrument panel between one panel locus to the other panel locus.

14. A fluid exchange service cart comprising:
   a chassis having an exterior surface and an interior surface, the interior surface defining an interior cavity;
   a reservoir disposed at least partially within the interior cavity;
   a fluid channel in selectable fluid communication with the reservoir;
   a processor operable to selectively control the fluid communication between the reservoir and the fluid channel; and
   an instrument panel in wired data communication with the processor,
   wherein the chassis further comprises a plurality of panel loci, each panel locus being configured to detachably append the instrument panel to the chassis.

15. The fluid exchange service cart of claim 14, wherein the chassis is configured to be partially disassembled when moving the instrument panel between one panel locus to the other panel locus.

16. The fluid exchange service cart of claim 14, further comprising a scale configured to generate weight data indicating a weight of the reservoir.

17. The fluid exchange service cart of claim 16, wherein the instrument panel is operable to display the weight data.

18. The fluid exchange service cart of claim 14, wherein the fluid channel is a first fluid channel, and further comprising a second fluid channel in selectable fluid communication with the reservoir, wherein the processor is further operable to selectively control the fluid communication between the reservoir and the second fluid channel.

* * * * *